US006205470B1

(12) United States Patent
Madden et al.

(10) Patent No.: US 6,205,470 B1
(45) Date of Patent: Mar. 20, 2001

(54) SYSTEM USES NETWORK MAINFRAME AND SERVERS FOR PROCESSING OF CHECKS TO MINIMIZE SYSTEM USAGE INTERRUPTIONS

(75) Inventors: Patrick Madden, Orland Park; Leonard Clair, Downers Grove, both of IL (US)

(73) Assignee: Professional Networking Consultants, Inc., Orland Park, IL (US)

( * ) Notice: Subject to any disclaimer, the term of this patent is extended or adjusted under 35 U.S.C. 154(b) by 0 days.

(21) Appl. No.: 09/039,301

(22) Filed: Mar. 14, 1998

Related U.S. Application Data

(63) Continuation-in-part of application No. 60/039,072, filed on Mar. 14, 1997.

(51) Int. Cl.[7] .................................................. G06F 15/16
(52) U.S. Cl. ......................................... 709/203; 709/201
(58) Field of Search .................................... 709/201, 203, 709/217, 236; 707/911; 710/48, 261, 263, 268; 358/1.15

(56) References Cited

U.S. PATENT DOCUMENTS

| | | | |
|---|---|---|---|
| 4,024,505 | * | 5/1977 | Sperling . |
| 5,170,466 | | 12/1992 | Rogan et al. . |
| 5,301,350 | | 4/1994 | Rogan et al. . |
| 5,321,816 | | 6/1994 | Rogan et al. . |
| 5,559,933 | * | 9/1996 | Boswell ............................. 358/1.15 |
| 5,689,625 | * | 11/1997 | Austin et al. ....................... 358/1.15 |
| 5,761,396 | * | 6/1998 | Austin et al. ....................... 709/201 |
| 5,781,711 | * | 7/1998 | Austin et al. ....................... 358/1.15 |

OTHER PUBLICATIONS

P A Savage–Knepshield et al.; "Interaction in Information Retrieval: Trends Over Time"; Journal of the American Society for Information Science; 50(12):1067–1082, 1999.*
C Haber; "Unisys Seeks A New Route"; Electronic News; p. 1, Jan. 1998.*
M Maclachlan; "Microsoft, Unisys Unite on NT"; Techweb News, Oct. 1997.*
P Chen et al., "Intergarting Noninteractive Document Processors Into an Interactive Environment"; Univ. of California, Apr. 1987.*

* cited by examiner

Primary Examiner—Le Hien Luu
(74) Attorney, Agent, or Firm—Niro, Scavone, Haller & Niro

(57) ABSTRACT

The present invention comprises a Document Process Server (DPS) for users of mainframes, such as Unisys' IPS and DPI 800/DP500 Series Reader/Sorters. The DPS allows ORS and Poll Select DP Series Reader/Sorters to be connected to ClearPath™/A/V Series Unisys mainframes via LAN/WAN connectivity and/or economical telephone company connections such as Frame Relay. The DPS enhances the IPS/DP Series user's system in that it allows ClearPath™/A/V Series users to use LAN/WAN connectivity with their existing Reader/Sorter investment. ClearPath ™ users are not required to purchase new NDP Reader/Sorters since Unisys does not support the ORS interface. "Click"/usage charges associated with the NDP Series are averted. Cost of dedicated telephone lines and MUX equipment are not needed. V Series users are not required to purchase single or multiple dedicated A/ClearPath™ Series to interface TCP/IP to the V Series host. System interrupts are minimized saving processor cycles and disk accesses.

1 Claim, 5 Drawing Sheets

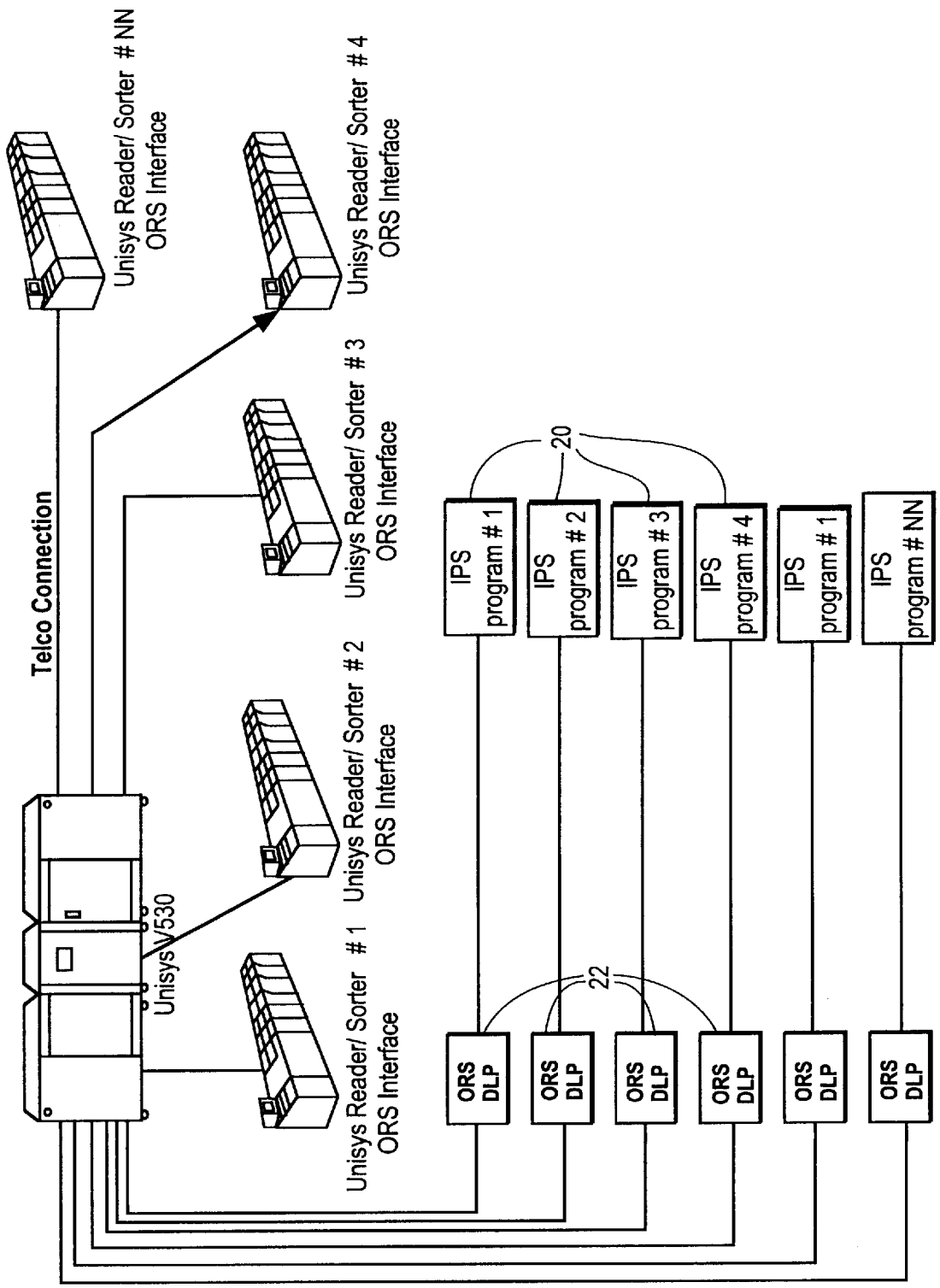

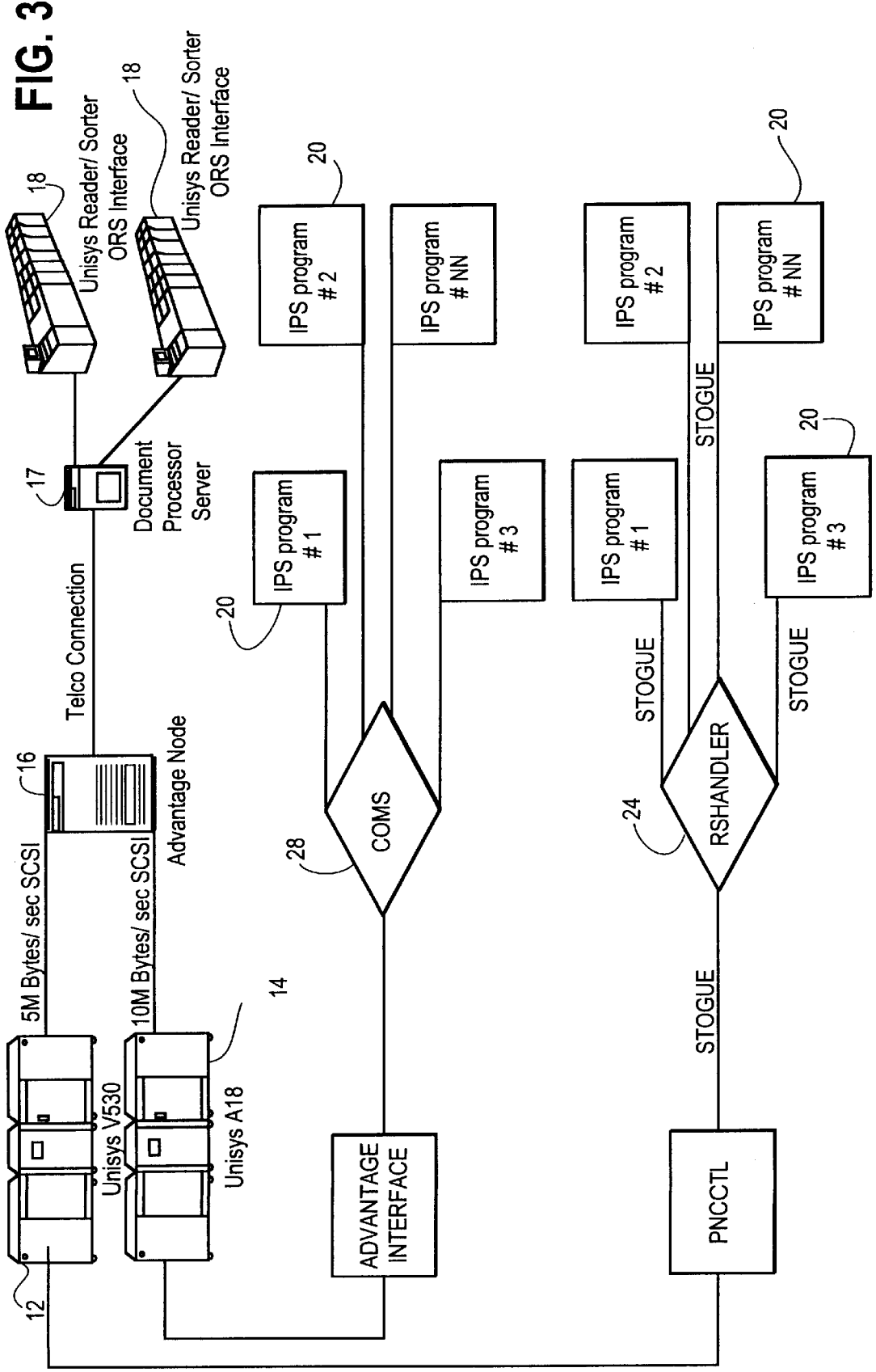

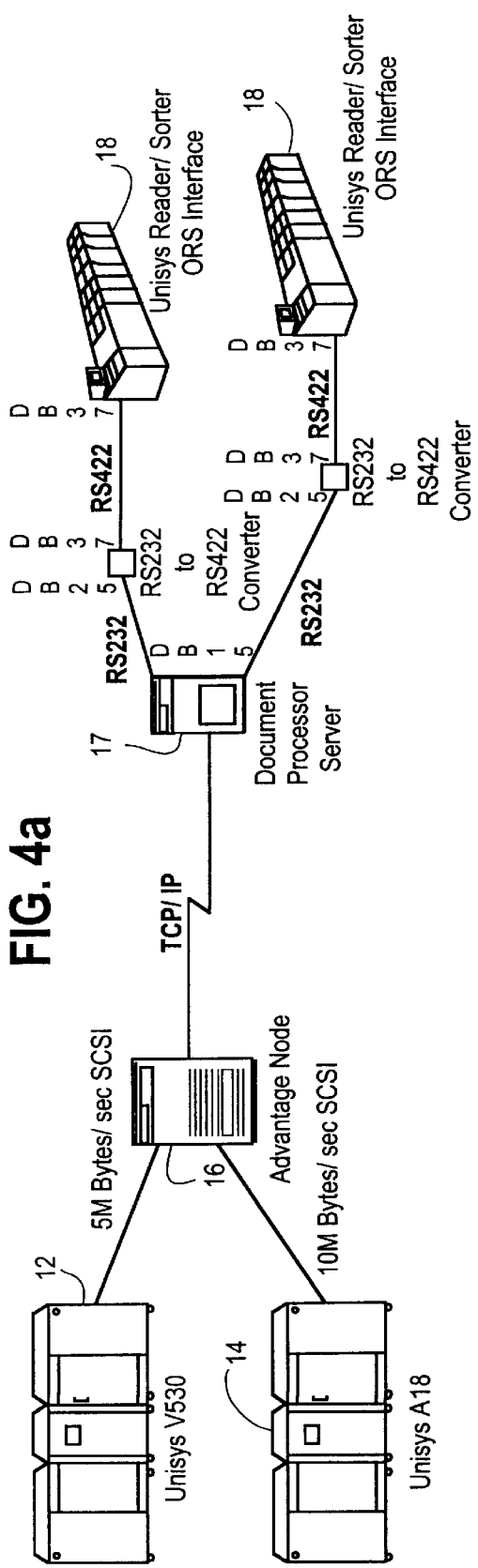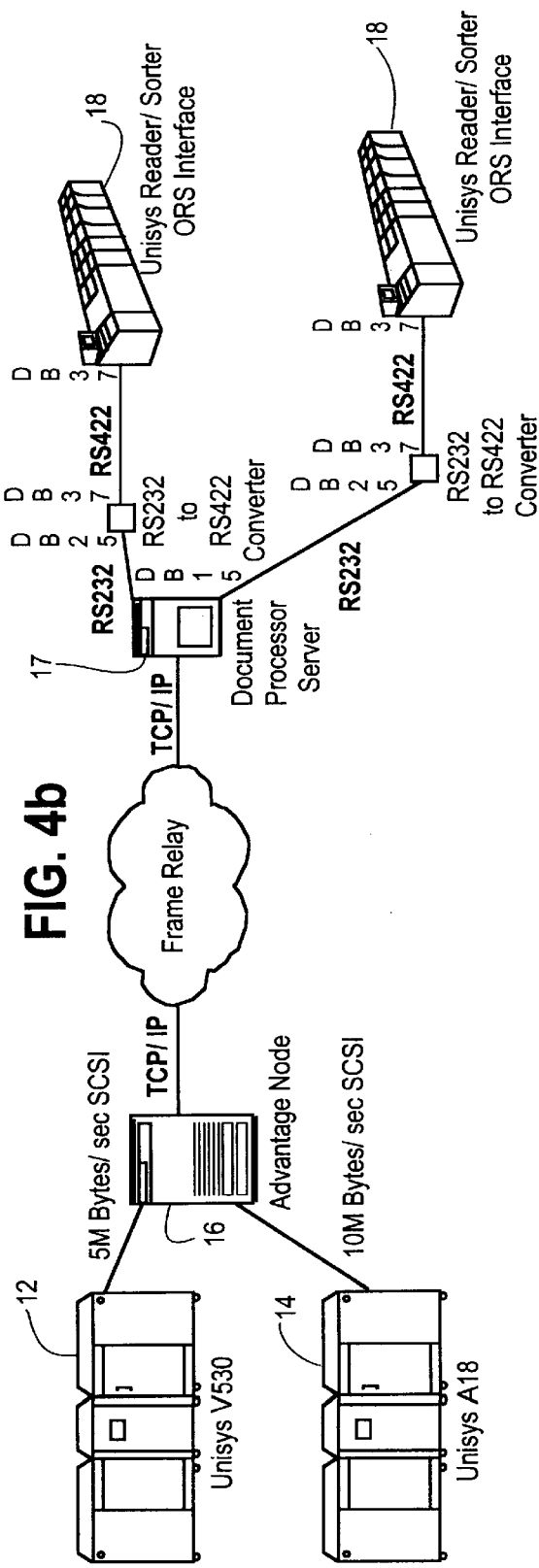

SYSTEM USES NETWORK MAINFRAME AND SERVERS FOR PROCESSING OF CHECKS TO MINIMIZE SYSTEM USAGE INTERRUPTIONS

This is a continuation in part of application Ser. No. 60/039,072 filed on Mar. 14, 1997.

BACKGROUND OF THE INVENTION

The present invention is directed towards a unique network configuration for the processing and sorting of documents, checks and the like. Specifically, the present invention comprises the implementation of a Document Processor Server ("DPS") to optimize the use of a Off-Load Reader/Sorter ("ORS") DLP's and its accompanying Item Processing System ("IPS") software by integrating the data to be processed into a LAN/WAN configuration. The ORS interface described in the present invention is designed for use on Unisys "V" and "A" Series, as well as Unisys ClearPath™ series computer systems. The Our approach will run ORS Reader/Sorters on ClearPath™, thus protecting the users's investment and not forcing Reader/Sorters upgrades. DL#1 DP1000/DP1800 ORS Reader/Sorter can add the Network Document Processor ("NDP") function and thus be dual bootable—i.e., ORS and NDP interfaces.

DESCRIPTION OF THE PRIOR ART

The use of mainframe relay systems for the routing and processing of checks and other data using ORS hardware is well known, as reflected, for example, in U.S. Pat. Nos. 5,170,466, 5,301,350, and 5,321,816. These documents discuss generally the hardware configurations of high-capacity, high-speed storage/retrieval systems, and their disclosures are incorporated by reference.

Please note the term Off-Load is a relative term which is due to restrictions of the on-board Reader/Sorter processor (Motorola 68000 series) and the very limited on-board Reader/Sorter memory (for buffering). In the ORS mode of these designs, the host system is used as an extension of Reader/Sorter's very limited memory resources—for buffering. Unisys requires 1 (one) ORS DLP per Reader/Sorter (refer to FIG. #1). Each ORS DLP generates interrupts for its own Reader/ Sorter. Thus 16 Reader/Sorters generate 16 separate interrupts. The more Reader/Sorters, the more ORS DLPs. These DLPs use card slots and cabinets. This also means that cards positioned at lower addresses will not receive the priority that higher level addresses receive. This forces the host personnel to select which Reader/Sorters are more important and which Reader/Sorter are less important. The Reader/Sorter will idle if it is waiting for the system due to priority or it loses synchronization with the ORS DLP.

The prior art lacking any disclosure or teaching of providing LAN/WAN connectivity and/or economical telephone company connections (such as Frame Relay) for the mainframe/ORS interface connection. These references also fail to teach the elimination of a need for one ORS DLP per Reader/Sorter, or the need to avoid generating a separate interrupt for each Reader/Sorter. Due to the ORS DLP hardware buffering limitation of these designs, "burps" are frequent. A "burp" is where the data comm synchronization cannot be maintained because the system and/or IPS is accessing the ORS DLP. When synchronization is lost and the Reader/Sorter idles, no checks or documents are sorted. These and other needs are addressed by the disclosure of the present invention, as set forth below.

SUMMARY OF THE INVENTION

The present invention involves the use of a DPS to relay information from an ORS interface to a mainframe computer via LAN/WAN connectivity and/or economical telephone company connections such as Frame Relay.

The Advantage Connectivity System® communicates to the Reader/Sorter locally, sends the data to the host which routes the data to the proper Unisys IPS program(s). The Advantage Connectivity System® looks like two Unisys 2145 magnetic tape to the Unisys V/A/ClearPath™ Series Unisys host.

The DPS communicates with the ORS Reader/Sorter at the remote location, encapsulates data in a TCP/IP packet, places the data on the WAN, the TCP/IP packet is delivered to the Advantage Connectivity System® where the Advantage sends the data to the host which routes the data to the proper Unisys IPS program(s). The Advantage Connectivity System® looks like two Unisys 2145 magnetic tape units to the Unisys V/A/ClearPath™Series Unisys host.

The benefits of present invention include the following:

1. Reduces host overhead—to service interrupts.
2. Gives LAN/WAN connectivity for ORS Reader/Sorters.
3. Eliminates needs of special Multiplexers like Codex.
4. Saves on separate non-WAN Data Comm lines.
5. Eliminates need to upgrade and potential "click" (utilization) charges.

The present invention also allows users of Unisys' ClearPath™/A/V/Series host(s) who use Unisys' IPS software and DP1800/DP1000 series Reader/Sorter hardware to:

Reduce host overhead—save processor cycles and/or I/O interrupts.

Allows LAN/WAN connectivity for Unisys DP1800/DP1000 ORS Reader/Sorter.

Provides WAN (Frame Relay) usage—cut telephone costs.

Through WAN connectivity deliver data faster.

Through WAN connectivity provides one common telco solution.

Eliminates costs of separate non-WAN telco connections.

Eliminates costs of separate non-WAN hardware such as MUXes.

Eliminates costly upgrade(s) to NDP for network connectivity.

Allows ClearPath users and alternative to replacing ORS Reader/Sorters.

The present invention reduces the interrupts (I/Os) and overhead of prior ORS approaches in that it can use SCSI 8 K message and "piggyback" up to 4 reads and/or writes per I/O (8 K message divided by a 2 K record=4).

The present invention offers ORS users a less expensive method of connecting remote Reader/Sorters via WAN/LAN without having to purchase NDP upgrade kits nor NDP Reader/Sorters. The present invention also eliminates the need for dedicated non-Wan 56 K lines with special multiplexer equipment. Print can either be routed to a network card in the printer or spooled to the WindowsNT™ PC of the DPS. Processor overhead is saved by not having to service multiple interrupts from multiple ORS DLPs.

DESCRIPTION OF THE DRAWINGS

The novel features which are characteristic of the invention are set forth in the appended claims. The invention itself, however, together with further objects and attendant advantages thereof, will be best understood by reference to the following description taken in connection with the accompanying drawings, in which:

FIG. 2 shows a block diagram displaying an example of the previous ORS software interface.

FIG. 3 shows a block diagram displaying the DPS software interface of the present invention.

FIGS. 4a and 4b show example hardware configurations of the present invention utilizing, respectively, TCP/IP protocol and a Frame Relay connection.

DETAILED DESCRIPTION OF THE PREFERRED EMBODIMENTS

Figure 1A:
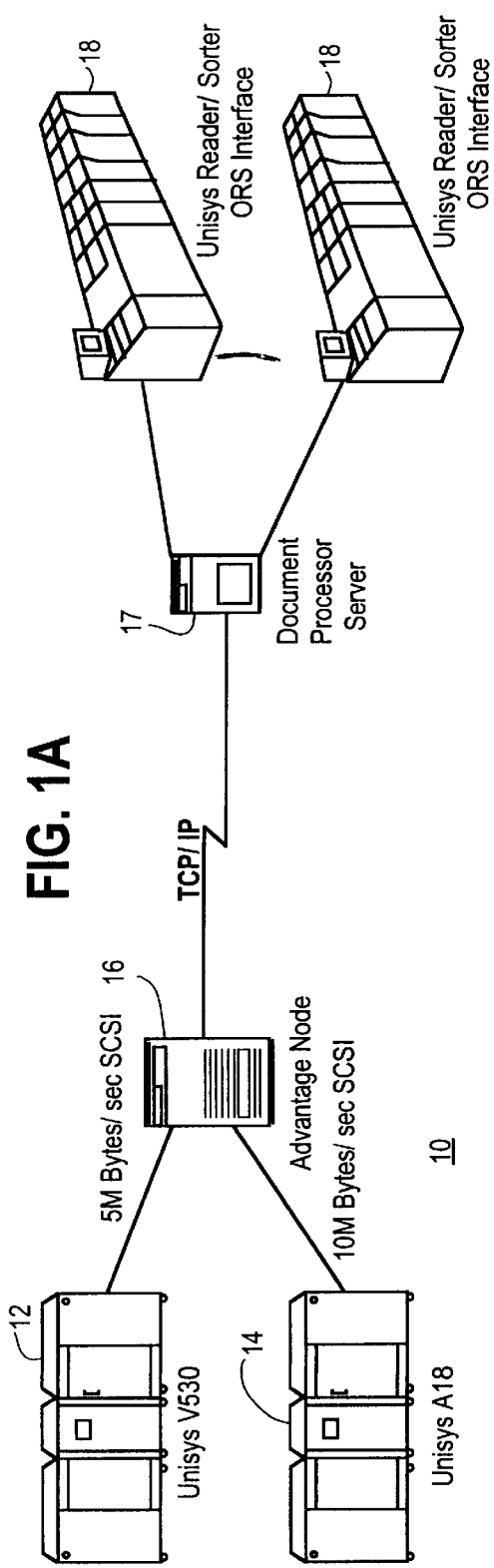
FIG. 1a shows a hardware configuration of the DPS system of the present invention utilizing a TCP/IP protocol.
Figure 1B:
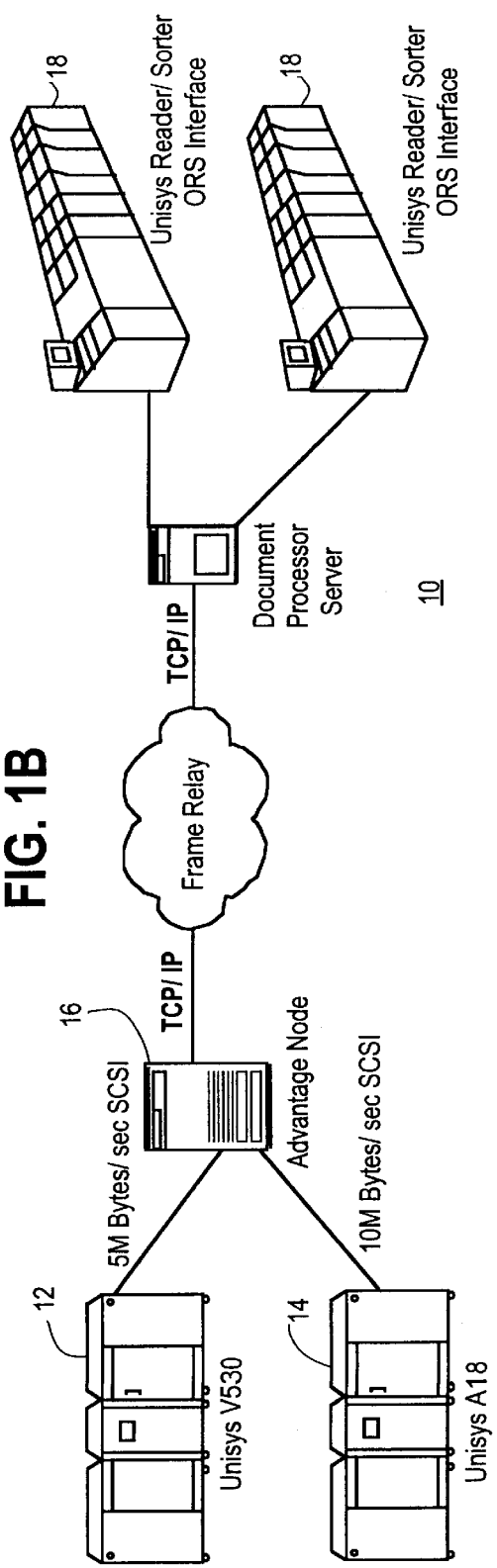
FIG. 1b shows the hardware configuration of the DPS system of the present invention utilizing a Frame Relay connection.
Figure 5:
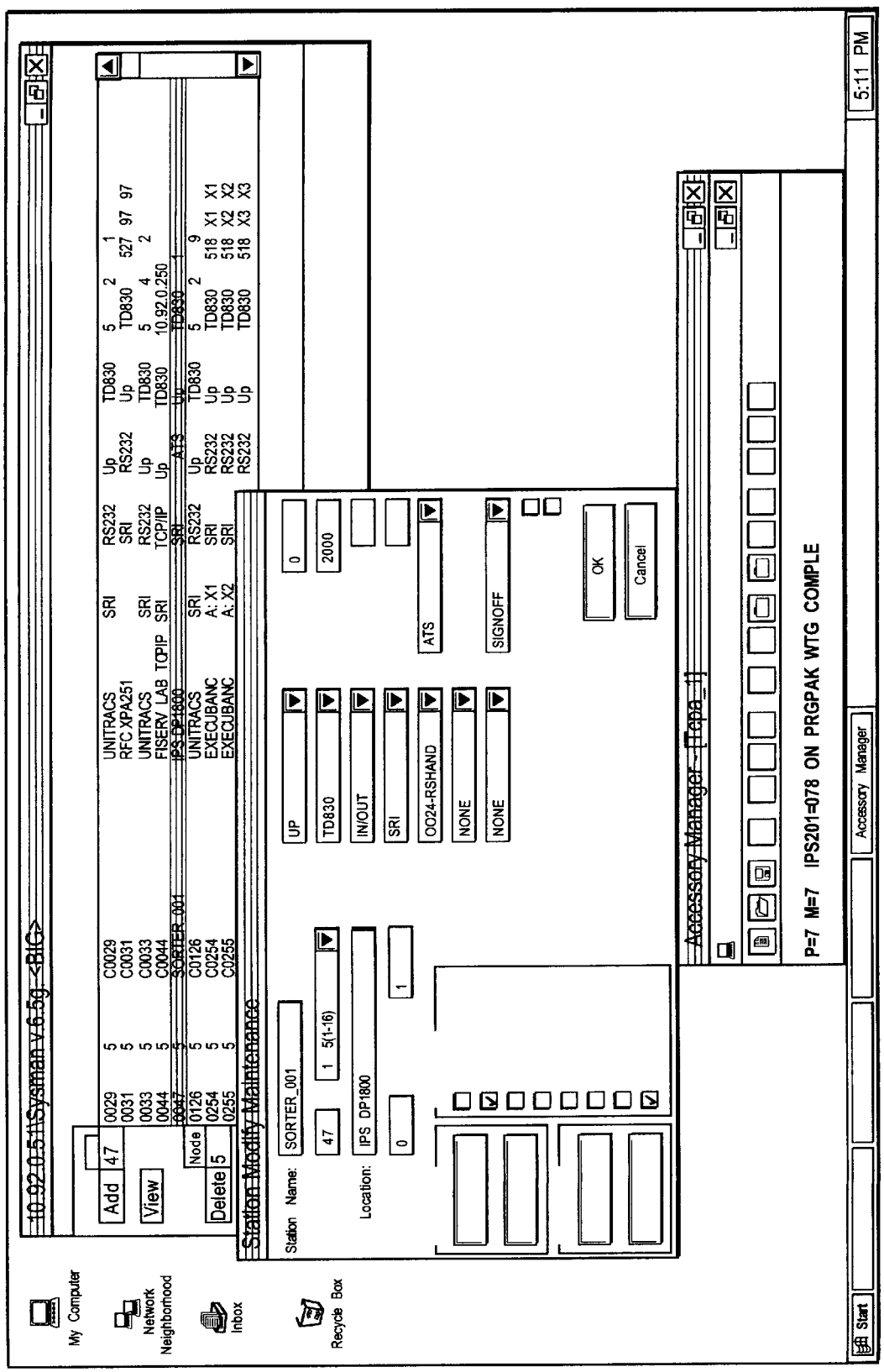
FIG. 5 shows an example terminal screen display utilizing the DPS software interface of the present invention.

As reflected in FIGS. 1a and 1b, the system 10 of the present invention preferably involves a configuration including a number of mainframes 12, 14, an Advantage Terminal Server or node 16, a DPS (Document Processor Server) 17, and a plurality of Reader/Sorters 18, each Reader/Sorter having an ORS interface. As shown in FIG. 2, existing designs call for each ORS DLP and ORS connected to a Reader/Sorter requires a set of IPS programs 20 running in the host system's mix. The ORS DLP 22 is a single card 4 line DC DLP that generates interrupts when data is to be presented to the host. The MAP must use host processor cycles to service these interrupts. The MAP must execute code to find who issued the interrupt. The more ORS DLPs, the more interrupts generated and the more that the processor is consumed servicing those interrupts. As shown in FIG. 3, the DPS host approach is to use STOQUE and message "piggybacking" to minimize system interrupts and deliver the messages as efficiently as possibly. The DPS Reader/Sorter handler program 24 delivers messages via STOQUE to the appropriate IPS programs.

The present invention, as applied to the V Series mainframes, is to use message "piggybacking" and STOQUE and a Reader/Sorter hander (RSHANDLER) 24 to route data to the appropriate IPS program. In the "A" series computer systems, the message(s) stay one place in memory (library calls) and the pointer is moved from PSH (Protocol Specific Handler) to COMS 28 before the buffer is handed to the appropriate program. Host system efficiencies are in the single SCSI DLP/Channel adapter as a source of interrupts, more data per I/O or interrupt (the "piggybacking" of messages) and handling of pointer/data within memory.

For remote batch applications, the present invention preferably uses the ATS (Advantage Terminal Server) 16. The ATS polls the DP500 at the remote location encapsulates data in a TC/IP packet, places the data on the LAN/WAN, the TCP/IP packet is delivered to the Advantage Connectivity System® where the Advantage sends the data to the host and the MCS or COMS routes the data to the proper application program. The Advantage Connectivity System® looks like two Unisys 2145 magnetic tape units to the Unisys V/A/ClearPath™ Series Unisys hosts.

The preferred specific hardware and software requirements of the present invention are as follows:
Preferred Hardware Requirements
 Unisys ORS interface
 DP1800/DP1000
 Unisys ClearPath™/A/V Series host(s)
 Advantage Connectivity System
 DPS
 RS232 to RS422 converter
 RS232 cable with DB15 and DB2.5 connectors
 RS232 cable with 2(two) DB37 connectors
 2 Data Comm ports available for Reader/Sorter or AIC terminal
 WAN hardware and telco connections
 Male plug on the cable bulk head is a remote ORS interface and needs no adapter—DCE ready.
 Female plug on the cable bulk head is a direct connect ORS interface and needs either a null modem cable or the Unisys remote ORS internal cable—DTE ready
Preferred Software Requirements
 Unisys IPS software
 PNC Advantage Connectivity System® software
 DPS software
 DPS host software
 V Series IPS copy libraries
 PNC copy libraries The Advantage Connectivity System component 28 preferably employed in the present invention uses SCSI DLP(s) or Channel Adapter(s) to communicate with the mainframe. The SCSI DLP interface speed is 5 M bytes per second or SCSI Channel Adapter interface speed is 10 M bytes per second. This is much faster than the Unisys "A"/ClearPath™ Series implementation of 450 K bytes per second ICP interface. The throughput math renders 450 K bytes/second divided by 10 M bytes (450,000/10,000,000) equals 0.045 or 4.5%. Thus Advantage Connectivity System® installed via SCSI Channel Adapter would possess 95.5% more potential throughput than the Unisys' ICP implementation. The Advantage Connectivity System® is SCSI3 capable. Trials of this component with the present invention has benchmarked the Advantage Connectivity System® (Pentium 133) at 160 transaction per second (2 I/Os per transactions). In addition to the larger "pipe" to the mainframe, the Advantage component supports any Windows NT™ topology such as Ethernet, Fast Ethernet, FDDI (Fiber Optic) or Token Ring. This adds more network speed and a very large network "pipe" to a very large system "pipe" for large and mission critical applications such as document processing.

TCP/IP is native to UNIX systems in that UNIX does the sending of the packets to the correct IP address, Dynamic Rerouting, maintains conversation between both computers, reformatting etc. referred to as network and protocol "housekeeping." This is an inherent function of that operating system. The same is true of IPX/SPX and Novell. Neither TCP/IP, IPX/SPX nor HLCN are native to the Unisys ClearPath™ or "A" or "V" Series. The "On-Board" approach is where the network and protocol "housekeeping" is done within the Unisys mainframe processing complex, by the mainframe's CPU. The present: invention utilizes an "Out-Board" approach, outside the Unisys mainframe processing complex, where the Unisys mainframe CPU and memory are off-loaded of the network and protocol "house-keeping" functions The Advantage Connectivity System® off loads the network and protocol "housekeeping" for the Unisys host. This renders a tremendous saving in host processing resources.

When used with Professional Networking Consultant's Advantage Connectivity System® or ATS (Advantage Terminal Server) the DPS user has a total network solution to deploy software, hardware and capacity as needed as well as an effective methodology of providing responsive Disaster/Recovery. The DPS product is WindowsNT™ based. Preferably, the implementation of the present invention should result all devices whether hosts, PCs, teller terminals, personal banking devices and Reader/Sorters being networked and accessible (with proper security) to anyone on the network.

Of course, it should be understood that various changes and modifications to the preferred embodiments described herein will be apparent to those skilled in the art. For instance, the interface protocol of the present invention could be employed with non-unisys mainframes. Such changes and modifications can be made without departing from the spirit and scope of the present invention and without diminishing its attendant advantages. It is, therefore, intended that all such changes and modifications be covered by the following claims.

What is claimed is:

1. A storage and retrieval system for implementing a processing of checks through a network connection so as to minimize usage of interrupts, said system comprising:

at least one mainframe computer;

at least one reader/sorter having an interface, said at least one reader/sorter capable of generating a plurality of electronic messages from data obtained from the processing of checks;

a document process server for handling the plurality of messages from said at least one reader/sorter, said document process server encapsulating said plurality of messages and relaying said messages to said at least one mainframe through a network connection utilizing a single interrupt of said mainframe;

at least one terminal server connected to said mainframe computer, said terminal server capable of receiving and routing said plurality of messages from said document process server to said mainframe, said terminal server converting protocol messages from said mainframe into packets for relay over a network connection.

* * * * *